US007302455B1

(12) United States Patent
Cordsmeyer et al.

(10) Patent No.: US 7,302,455 B1
(45) Date of Patent: Nov. 27, 2007

(54) SYSTEM AND METHOD FOR RELIABLY PURGING STATISTICAL RECORDS

(75) Inventors: Joel E. Cordsmeyer, Tucker, GA (US); Frederick Edwards, Ellenwood, GA (US); Robert J. Bates, Cumming, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 491 days.

(21) Appl. No.: 10/082,846

(22) Filed: Feb. 26, 2002

(51) Int. Cl.
*G06F 17/00* (2006.01)

(52) U.S. Cl. ............... 707/206; 707/205; 707/204; 707/102

(58) Field of Classification Search ............... 707/206, 707/205, 200; 705/30
See application file for complete search history.

(56) References Cited

U.S. PATENT DOCUMENTS

| 5,566,315 A * | 10/1996 | Milillo et al. ............. 711/113 |
| 5,638,508 A * | 6/1997 | Kanai et al. .................. 714/20 |
| 5,802,563 A * | 9/1998 | Hagersten et al. .......... 711/122 |
| 5,813,009 A * | 9/1998 | Johnson et al. ............ 707/100 |
| 5,933,840 A * | 8/1999 | Menon et al. .............. 707/206 |
| 5,961,613 A * | 10/1999 | DeNicola ..................... 710/18 |
| 6,216,127 B1 * | 4/2001 | Gans et al. ................... 707/10 |
| 6,249,792 B1 * | 6/2001 | Zwilling et al. ........... 707/205 |
| 6,295,582 B1 * | 9/2001 | Spencer ...................... 711/135 |
| 6,349,314 B1 * | 2/2002 | Patel .......................... 707/206 |
| 6,523,102 B1 * | 2/2003 | Dye et al. ................... 711/170 |
| 2002/0118954 A1 * | 8/2002 | Barton et al. ................. 386/83 |

* cited by examiner

*Primary Examiner*—Sana Al-Hashemi
(74) *Attorney, Agent, or Firm*—Potomac Patent Group PLLC

(57) ABSTRACT

Improvements to existing statistical record memory purge procedures and processes are shown and described. Certain procedures ensure that there is adequate temporary memory for storing new statistical records before purging older statistical records from permanent memory. Certain of the procedures wait a predetermined amount of time before reevaluating whether there is adequate temporary memory for storing new statistical records. After older statistical records have been purged, certain of the procedures update any indices or pointers utilized by permanent memory. The improvements may be implemented in a telecommunications system having a plurality of managed elements, each of the managed elements potentially generating statistical data that is communicated to one or more statistics servers.

11 Claims, 3 Drawing Sheets

SYSTEM AND METHOD FOR RELIABLY PURGING STATISTICAL RECORDS

I. Background

A. Field of the Invention

This invention relates generally to the field of network management, and more particularly to maintenance operations on elements within a managed telecommunications network.

B. Copyright Notice/Permission

A portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright. COPYRGT.2001-002, BellSouth Intellectual Property Management Corporation.

C. Description of the Related Art

Telecommunications companies (i.e., service providers) build, operate, and maintain very large communications and related networks. Part of the operation and maintenance of these networks involves the use of operations software, typically divided into a number of functional areas such as engineering, provisioning, and the like. Provisioning software aids service providers in receiving requests for service or alterations to existing service, be it voice and/or data, and configuring both the telecommunications network and/or related networks and systems (e.g., accounting, billing, and the like) to provide the new service requested. Engineering operations software in contrast is typically used by service providers to configure and monitor network elements to ensure they perform their functions properly. Service providers also use engineering operations software to facilitate service provisioning and monitoring.

One of the primary engineering operations software systems is the element management system (EMS) software. Typical EMS packages are centralized service network management applications that manage and control (typically via standards such as SNMP and the like) the various elements in the telecommunications and/or related networks. Within the core telecommunications network the elements often are multiservice elements such as frame relay, SMDS, ATM, IP, and/or the like switches. Some of the operations performed by typical EMS packages include: circuit provisioning to establish end-to-end network connectivity; logical provisioning of individual circuits and to establish network-wide parameters; providing audit trails on activities such as the length of a user session and the addition or modification of switches, logical ports, trunks, circuits, and the like; display of network statistics for real-time status information on logical and physical ports; display of usage data on logical and physical ports and the like for network planning and trend analysis; and collecting different types of traps for alarm indications and statistics logging for the numerous objects in the telecommunications networks (e.g., switches, trunks, physical ports, logical ports, permanent virtual circuits, switched virtual circuits, and the like).

With regard to gathering statistics in particular, the EMS package typically collects records from the various elements in the network being managed and sends them to a central repository comprised of one or more statistics databases via one or more statistics servers. However, with the explosive growth in demand for telecommunications services over the past few years the number of elements within the service providers' networks have dramatically increased. As a result, the number of statistic records generated by the various elements in service providers' networks has swelled, thereby generating so many records at a such a rapid pace that existing systems and methods of collecting, analyzing, and managing these statistic records often have been overwhelmed. Accordingly, there is a need for improved systems and methods of collecting and managing statistical records in telecommunications and/or related networks.

II. SUMMARY OF THE INVENTION

In a telecommunications system having a plurality of managed elements, many if not all of the managed elements generating statistical data that is communicated to one or more statistics servers, an improved statistical record purge procedure, the improvement comprising running the purge procedure less often and at times when there is likely to be relatively little new statistical data generated by the managed elements. Existing purge procedures also may be improved by ensuring there is adequate temporary storage or log space in the one or more statistics servers for new statistical records generated by the statistics servers while the corresponding statistics database is having older records expunged. The purge procedure also may be improved through the inclusion of instructions that update or reset any pointers or indices in the statistics database after older records have been expunged.

III. BRIEF DESCRIPTION OF THE DRAWINGS

These and other features, aspects, and advantages of the invention will become better understood in connection with the appended claims and the following description and drawings of various embodiments of the invention where:

IV. DETAILED DESCRIPTION OF THE PREFERRED EMBODIMENTS

Throughout the following detailed description similar reference numbers refer to similar elements in all the figures of the drawings.

Figure 1:
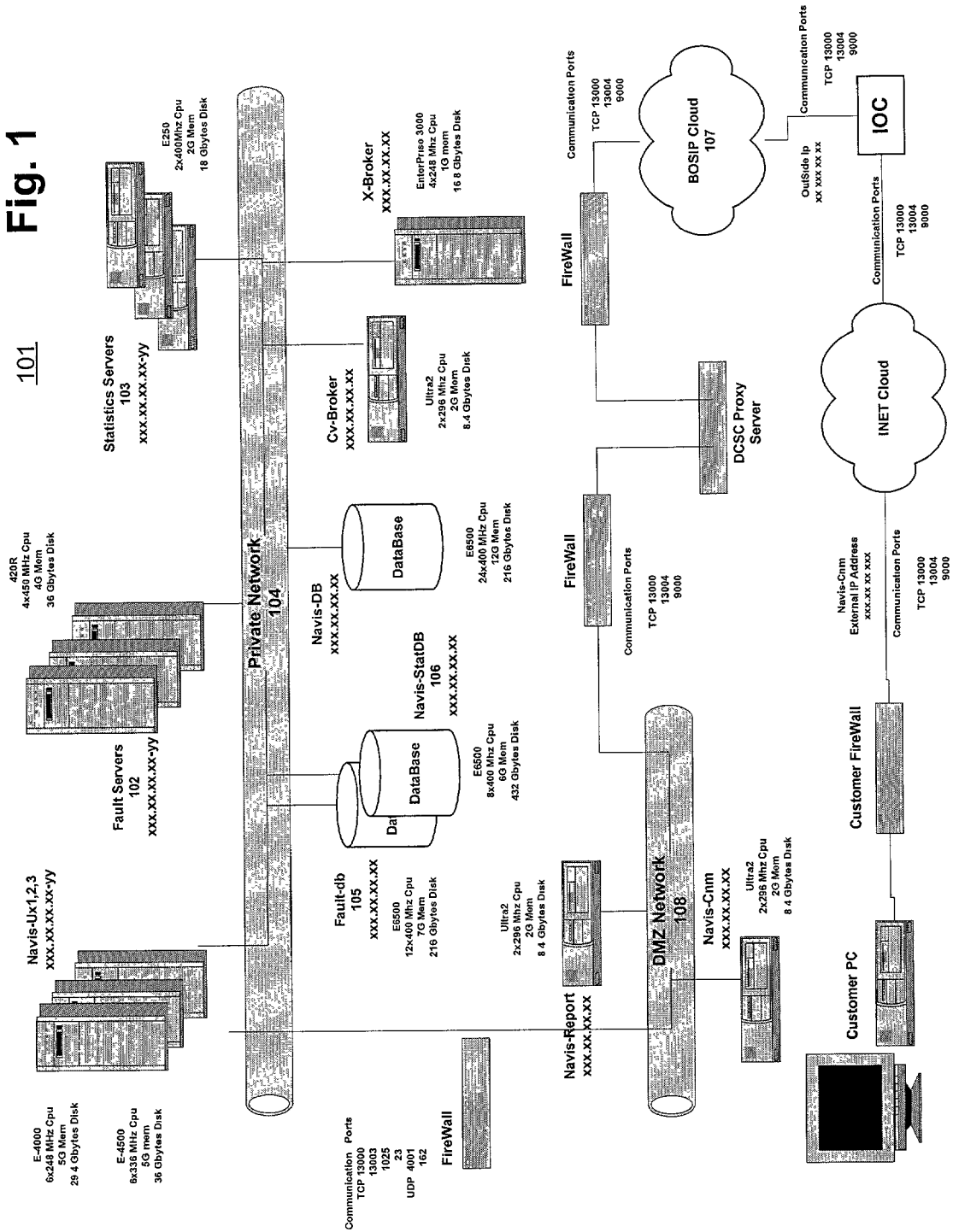
FIG. 1 illustrates and an exemplary network within which the invention may be implemented.

FIG. 1 illustrates an exemplary network 101 in which the invention may be implemented. Network 101 is based in part on the EMS developed and marketed by Lucent Technologies of Murray Hill, N.J. under the trademark NAVISCORE. The NAVISCORE EMS is a distributed multiservice element manager that utilizes a graphically integrated UNIX-based platform and telecommunications network management (TNM) standards to perform its network management and control functions. Network 101 also includes portions of a suite of management servers developed and marketed by Lucent Technologies under the trademark NAVISEXTEND ENVIRONMENT. The NAVISEXTEND ENVIRONMENT extends the functionality of the NAVISCORE EMS. Network 101 as depicted includes a plurality of fault servers 102 and statistics servers 103 operatively connected to a private network 104. Network 101 also includes a fault database 105 and a statistics database 106 operatively connected to private network 104. As will be understood by one skilled in the art, network 101 need not include many of the elements depicted therein (e.g., fault servers 102, firewalls, DMZ network 108, and the like), and may include any number of other elements not depicted in FIG. 1 (e.g., provisioning servers, accounting servers, and the like).

In operation, the various switches and/or other managed network elements (not shown) in the telecommunications network 107 compile statistical data about their operations almost constantly. Periodically the statistics servers 103 poll the various switches and/or other elements in network 107 and the switches and/or other elements send to the statistics servers (via the demilitarized zone (DMZ) network and the private network 104) the statistical data each has compiled since it was last polled. The statistics servers 103 convert the statistical data into American Standard Code for Information Interchange (ASCII) formatted records and store the ASCII formatted messages in temporary memory or log space. The ASCII formatted statistical records are then sent periodically by the statistics servers 103 to the statistics database 106 via the private network 104, where the statistical records are stored in permanent memory and may be accessed by other systems in the network for analysis, troubleshooting, and the like. For example, the statistical records stored in statistics database 106 may be accessed by a report generator or similar software package (not shown) residing on another server such as a report server (not shown) so that real-time or close to real-time statistical data may be accessed by network operators.

Figure 2:
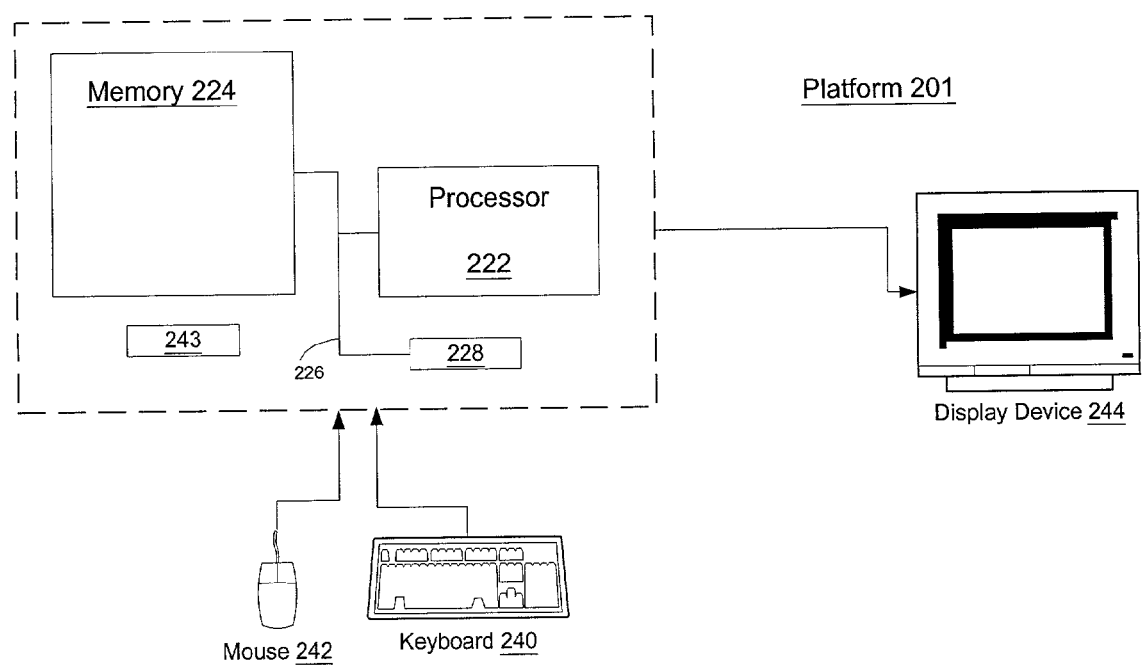
FIG. 2 illustrates the structure of an exemplary server that may reside within a network such as that illustrated in FIG. 1.

While one skilled in the art will understand that servers 103 may be implemented in any number configurations on any number of computing platforms, FIG. 2 illustrates a generic computing platform 201 for servers 103. As shown, computing platform 201 includes processing unit 222, system memory 224, and system bus 226 that couples various system components including system memory 224 to the processing unit 222. The system memory 224 might include read-only memory (ROM) and/or random access memory (RAM). The platform 201 might further include a hard-drive 228, which provides storage for computer readable instructions, data structures, program modules, other data, and the like. A user may enter commands and information into the platform 201 through input devices such as a keyboard 240 and pointing device 242. A monitor 244 or other type of display device may also be connected to the platform 201 for visual output. Communications device 243, which may be for example a TCP/IP enabled device, provides for connectivity to other computing devices within or beyond network 101 illustrated in FIG. 1. Processor 222 may be programmed with instructions to interact with other computing systems so as to perform the algorithms and operations described below. Processor 222 may be loaded with any one of several computer operating systems such as Windows NT, Windows 2000, Linux, and the like. In a particular embodiment of the invention, processing unit 222 comprises a 4×450 MHz CPU, system memory 224 comprises 4 Gigabytes of RAM, hard-drive 228 comprises a 36 Gigabyte disk-drive, and processor 222 includes a UNIX segment.

Because the information contained in the statistical records stored in permanent memory becomes stale at some point and the amount of storage space in the statistics database 106 or other permanent memory is necessarily limited, a purge script is run periodically to expunge a predetermined number of older statistics records stored in the statistics database 106. In one configuration of the statistics servers 103 a scheduler initiates the purge procedure, and a purge script ultimately calls on a Sybase stored procedure that resides in a UNIX-based segment of statistics database 106. Optimally, older statistical records would be kept for the duration of their usefulness while no younger or fresher statistical records would be lost due to insufficient storage space in the statistics database 106 or other permanent memory. In current networks it is not unusual to run the purge procedure numerous times per hour due to the sheer number of statistical records being produced by the large numbers of switches and/or other elements in the service providers' networks.

In the networks owned and operated by the assignee of the present invention however, running the statistical record purge procedure up to several times per hour, or even hourly, resulted in the loss of new statistical records (i.e., records generated during the period the purge procedure was running). We determined these losses were due in part to there being inadequate log space in the statistics server to temporarily store statistical records while the purge procedure removed old records from the statistics database 106. We also determined the foregoing losses were due to statistics database 106 deadlock errors occurring when the processes within the purge procedure and other processes running on the statistics server tried to access the statistics database simultaneously.

We therefore developed the following improvements to existing statistical record purge procedures to address the problems outlined above (as well as others). The existing purge procedures may be improved by scheduling the purge script to be run less frequently and at times when the network elements reporting to the statistics servers have relatively less statistical data to report. For example, in one embodiment of the invention the purge procedure is scheduled to run once daily early in the morning (e.g., 2 AM local time) because that is a time during which there is relatively less telecommunications activity, and therefore relatively less statistical data being sent to the statistics servers 103 by the switches and/or other network elements.

Another way that existing statistical record purge procedures may be improved is by adding instructions to the purge script that ensure there is adequate log space in the fault servers before the purge script begins deleting records from the statistics database. In most servers there is a dedicated portion of memory (i.e., temporary memory) to which the central processing unit temporarily stores data before writing or sending the data out to a more permanent memory space. For example, the fault servers 103 employed in the assignee of the present invention's network 101 store statistical records in onboard memory and periodically communicate the records that have accumulated in that log space to the statistics database 107.

Figure 3:
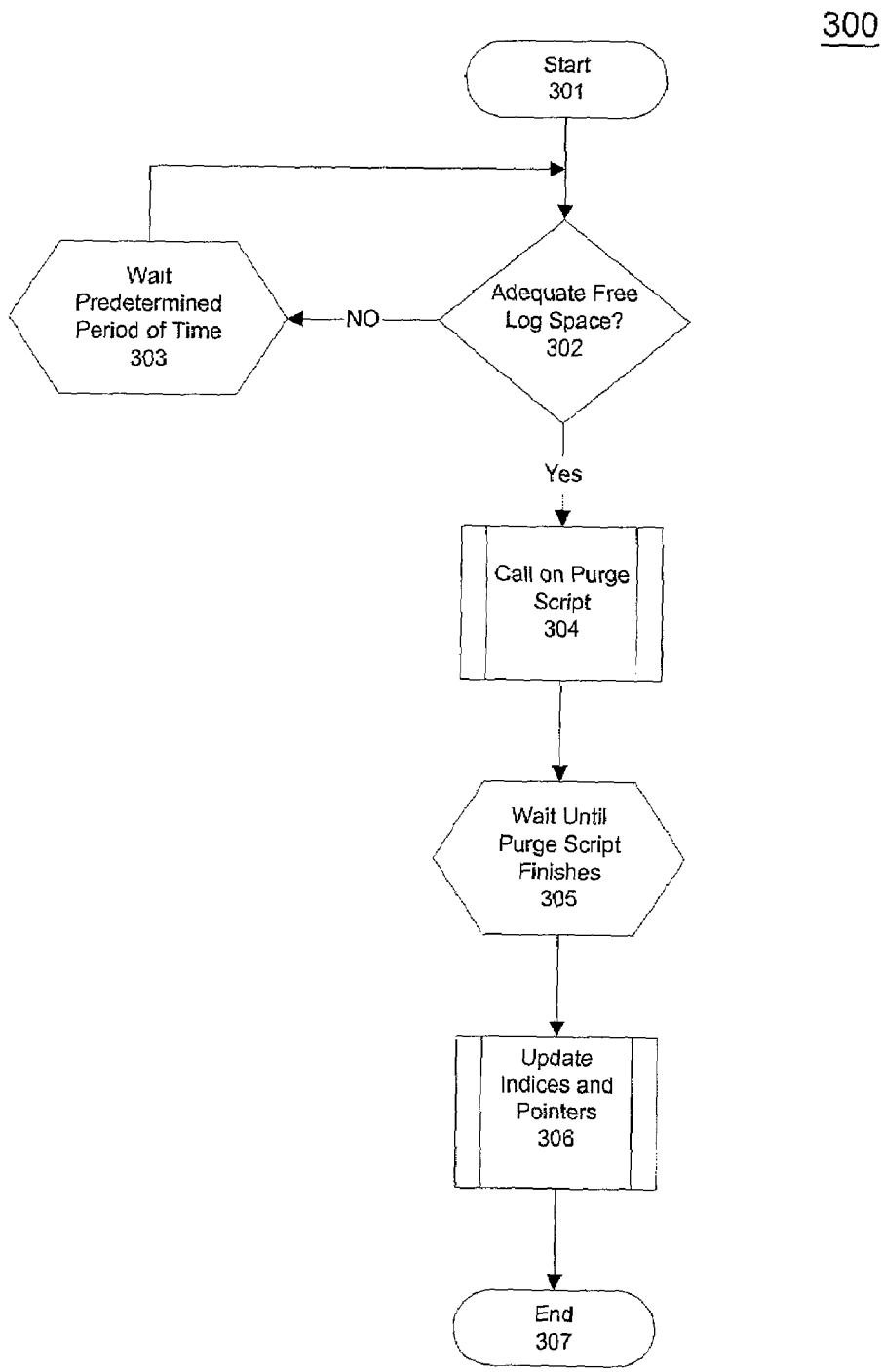
FIG. 3 illustrates in flow diagram form a method for improving existing statistical record purge procedures in accordance with an exemplary embodiment of the invention.

Because the statistical record purge procedure takes a finite amount of time and results in the statistics database being inaccessible to the statistics server(s) while the procedure is running, the temporary memory or log space for the statistics server(s) must have sufficient room to store all the new records generated by the statistics server(s) while the purge procedure is running. Otherwise, potentially important newly generated statistical records may be lost due to log space overflow. In an exemplary embodiment of the invention the additional instructions calculate whether there is 90% or more log space free before calling on the purge script to execute. If not, the scheduler on the fault server waits for approximately 30 seconds before checking the free log space again. The amount of free log space that is required will necessarily depend on a number of factors such as the number of statistical records likely to be generated during the time the purge script is running, how often the purge procedure is run (e.g., hourly, bi-hourly, daily, etc.), the size of the log space (e.g., 2052 Megabytes in the exemplary embodiment noted above), the size of the statistical records generated by the statistics server(s), and the like. Pseudocode for these instructions in accordance with an exemplary embodiment of the invention appear in Source Code Listing A shown below. Also, FIG. 3 illustrates in flow diagram form the method outlined above.

Note also that in the exemplary embodiment illustrated in Source Code Listing A, statistical records are maintained in the statistics database(s) for 30 days, the purge procedure is run once daily, and it takes approximately 20 minutes for the purge script to execute once it has been called by the scheduler on the fault server(s).

Another improvement to existing statistical record purge procedures that may be implemented is to update the pointers and/or indices in the statistics database(s) following the execution of the purge script. Updating the pointers results in notably faster read and write operations in the statistics database(s). Pseudocode for the instructions to update the pointers and indices in accordance with an exemplary embodiment of the invention are shown below as Source Code Listing B.

Source Code Listing A check purge.sh

```
prog='basename $0'
if test $#-lt 1
then
echo "Need dbname" >>/opt/BulkStats/etc/$prog.log
exit 1
fi
if test -s /opt/BulkStats/etc/$prog.log
then
dte='date +%d%b%Y'
mv -f /opt/BulkStats/etc/$prog.log \
   /opt2/BulkStats.var/$prog.log@$dte
compress -f /opt2/BulkStats.var/$prog.log@$dte
fi
DBNAME=NAVIS-STATN
export prog DBNAME
if ping -I 1 navis-statn 24 1|grep "0 packets received"
then
echo "navis-statn not responding at 'date'"\
   >>/opt/BulkStats/etc/$prog.log 2>&1
rm -f /BulkStats/data/NXStatisticsCbxGbx.purging
exit 1
fi
#######################################
# lock out other db type cron jobs !
#######################################
touch/BulkStats/data/NXStatisticsCbxGbx.purging
#################################################
             ##############
# this is a routine to check for an empty db log, if not
# sleep up to 10 minutes waiting for one
#################################################
             ##############
check db ( )
{
#################################################
             ##############
# loop up to 12 times, i.e. 6 minutes, until the logfile is
# close to 100% free
#################################################
             ##############
cnt=12
while true
do
remsh $DBNAME -l sybase -e /opt/sybase/query >/tmp/
$prog.$$ 2>&1 <<!
sp_helpdb $1
go
quit
exit
!
LogSize='cat/tmp/$prog.$$ | grep_log | awk '{print $2,$6}"
rm -f /tmp/$prog.$$
Size='echo $LogSize | awk '{print $1}' | cut -f1 -d'.'"
Free='echo $LogSize | awk '{print $2}"
Size='expr $Size \* 1024000'
Free='expr $Free \* 100000'
WFree='expr $Free V $Size'
RFree='expr $Free \% $Size'
RFree='echo $RFree | cut -c1 -2'
echo "$1 has $WFree.$RFree free logspace at 'date'"\
   >>/opt/BulkStats/etc/$prog.log 2>& 1
if test $WFree -gt 85
then
   echo >>/opt/BulkStats/etc/$prog.log 2>& 1
   break
else
   sleep 30
fi
cnt='expr $cnt - 1'
if test $cnt -lt 0
then
   echo "$prog: aborting because of full db log for $1"\
      >>/opt/BulkStats/etc/$prog.log 2>& 1
fi
done
}
export MinTime MaxTime
echo "$prog:\tStarting at 'date'\n" >>/opt/BulkStats/etc/
$prog.log
check_db "$1"
for x in TrkStat CktStat TrunkStat FrCktStat FrLportStat
ATMCktStat ATMPrtStat \
   ATMSvcStat ATMTrkStat ATMLPrtNiStat ATMLPrtTrk-
      Stat ATMFirstTrkStat \
   ATMOptTrkStat IpLportStat SmdsLportStat
do
MinTime='remsh $DBNAME -l sybase -e /opt/sybase/
   query <<!
use $1
go
select min(startTime) from $x
go
quit
exit
!'
if echo $MinTime | egrep "NULL|Msg" >/dev/null
then
echo "No table data for $x\n" >>/opt/BulkStats/etc/$pro-
g.log
```

```
continue
fi
MinTime=`echo $MinTime | awk '{print $2}'`
echo "$x:\tMinTime <$MinTime>" >>/opt/BulkStats/etc/
    $prog.log
if test $MinTime -le 950000000
then
echo "$x:\tbad number for MinTime"\
    >>/opt/BulkStats/etc/$prog.log
continue
fi
MaxTime=`/BulkStats/bin/perl5 -e '$utcseconds=time( );
print "$utcseconds\n"'`
echo "$x:\tMaxTime <$MaxTime>" >>/opt/BulkStats/
etc/$prog.log
if test $MaxTime -le 950000000
then
echo "$x:\tbad number for MaxTime"\
    >>/opt/BulkStats/etc/$prog.log
continue
fi
DiffTime=`expr $MaxTime - $MinTime`
DiffTime=`expr $DiffTime / 86400`
echo "$x:\tnumber of days in database is $DiffTime\n" \
    >>/opt/BulkStats/etc/$prog.log
#########################################
# delete all records older than 30 days
#########################################
if test $DiffTime -gt 31
then
Ttime=`expr $DiffTime -31`
DelTime=0
export DelTime
while true
do
  if test $Ttime -eq 0
  then
    break
  fi
  DelTime=`expr "$MinTime" + 86400`
  MinTime=`expr "$MinTime" + 86400`
  export DelTime MinTime
  echo "$x:\tDelTime <$DelTime>"\
    >>/opt/BulkStats/etc/$prog.log
  echo "$x:\tdelete $x where startTime < $DelTime at
    'date'\n" \
    >>/opt/BulkStats/etc/$prog.log
#################################################
# execute the 'query' file on remote server so
# passwd is not exposed !
#################################################
  remsh $DBNAME -l sybase -e /opt/sybase/query \
    >>/opt/BulkStats/etc/$prog.log 2>&1 <<!
use $1
go
delete $x where startTime < $DelTime
go
checkpoint
go
quit
exit
!
DiffTime=`expr $DiffTime - 1
echo "\n$x:\tnumber of days left in database is $Diff-
    Time"\
    >>/opt/BulkStats/etc/$prog.log
Ttime=`expr $Ttime -1`
echo >>/opt/BulkStats/etc/$prog.log
check_db "$1"
done
fi
done
rm -f /BulkStats/data/NXStatisticsCbxGbx.purging
echo "$prog:\tEnding at 'date'\n" >>/opt/BulkStats/etc/
$prog.log
```

Source Code Listing B check stats.sh

```
prog=`basename $0`
if test $#-lt 1
then
echo "Need dbname" >>/opt/BulkStats/etc/$prog.log
exit 1
fi
>/opt/BulkStats/etc/$prog.log
##if test -s /opt/BulkStats/etc/$prog.log
then
##mv -f /opt/BulkStats/etc/$prog.log \
    ##/opt/BulkStats/etc/$prog.log.old
##fi
DBNAME=NAVIS-STATN
export prog DBNAME
echo >>/opt/BulkStats/etc/$prog.log
for x in TrkStat CktStat TrunkStat FrCktStat FrLportStat
ATMCktStat ATMPrtStat \
  ATMSvcStat ATMTrkStat ATMLPrtNiStat ATMLPrtTrk-
    Stat ATMFirstTrkStat \
  ATMOptTrkStat IpLportStat SmdsLportStat
do
  echo "Starting update statistics $x at 'date'" >>/opt/
    BulkStats/etc/$prog.log
  remsh $DBNAME -l sybase -e /opt/sybase/query \
    >>/opt/BulkStats/etc/$prog.log 2>&1<<!
use $1
go
update statistics $x
go
quit
exit
!
  echo "Ending update statistics $x at 'date'\n"\
    >>/opt/BulkStats/etc/$prog.log
done
echo "$prog:\tEnding at 'date'\n" >>/opt/BulkStats/etc/
$prog.log
```

While the invention has been described in connection with various exemplary embodiments depicted in the various figures and appendices, it is to be understood that other embodiments may be used or modifications and additions may be made to the described embodiments for performing the same function of the invention without deviating therefrom. The invention therefore should not be limited to any single embodiment, whether depicted herein or not. Rather, the invention should be accorded the full breadth and scope encompassed by the claims appended below.

We claim:

1. A method of purging statistical records from a database, the method comprising the steps of:

determining an amount of time needed to perform a purge procedure, access to the database being limited during the purge procedure;

establishing an amount of temporary memory needed for storing new statistical records generated during the determined amount of time;

calculating an amount of temporary memory available for storing new statistical records generated during the determined amount of time; and selectively executing a purge procedure based on comparison of the amount of available temporary memory with the established amount of needed temporary memory.

2. The method of claim 1, wherein the execution of the purge procedure is delayed if the calculated amount of available temporary memory is below ninety percent of the temporary memory.

3. The method of claim 2, wherein the execution of the purge procedure is delayed by a predetermined period of time.

4. The method of claim 3, wherein the predetermined period of time is thirty seconds.

5. The method of claim 1, wherein the temporary memory comprises a log space.

6. The method of claim 1, further comprising the purge procedure removing records from the statistics database.

7. The method of claim 1 further comprising updating pointers upon completion of the purge procedure.

8. The method of claim 1, further comprising storing newly generated records in the temporary memory if the available memory is above the established amount of needed temporary memory.

9. The method of claim 8, further comprising moving records from the temporary memory to the statistics database upon completion of the purge procedure.

10. The method of claim 1 wherein the purge procedure is executed at least once a day.

11. The method of claim 1 wherein the purge procedure is executed if the calculated amount of available temporary memory is at least ninety percent of the temporary memory.

* * * * *